United States Patent
Hsu

(10) Patent No.: US 7,615,284 B2
(45) Date of Patent: Nov. 10, 2009

(54) CRYSTALLIZED GLASS ARTICLE HAVING PATTERNS AND METHOD OF PRODUCING THE SAME

(75) Inventor: Kuo-Chuan Hsu, Hsinchu (TW)

(73) Assignees: Jian Quan Glass Development Company Ltd., Hsinchu County (TW); Kuo-Chuan Hsu, Hsinchu (TW)

( * ) Notice: Subject to any disclaimer, the term of this patent is extended or adjusted under 35 U.S.C. 154(b) by 476 days.

(21) Appl. No.: 11/498,463

(22) Filed: Aug. 2, 2006

(65) Prior Publication Data

US 2007/0048529 A1    Mar. 1, 2007

(30) Foreign Application Priority Data

Aug. 30, 2005   (JP) .............................. 2005-248768
May 26, 2006   (JP) .............................. 2006-146549

(51) Int. Cl.
*B32B 17/06*   (2006.01)
*C03C 10/04*   (2006.01)

(52) U.S. Cl. ........................ 428/426; 501/5; 428/212; 428/428; 428/688; 428/697; 428/699; 428/701; 428/702

(58) Field of Classification Search ........................ None
See application file for complete search history.

(56) References Cited

U.S. PATENT DOCUMENTS 3,847,582 A   11/1974   Kozmin ......................... 65/33
3,955,989 A   5/1976   Nakamura .................. 106/39.6

FOREIGN PATENT DOCUMENTS

JP   48078217   10/1973
JP   6024768   2/1994

*Primary Examiner*—Ling Xu
(74) *Attorney, Agent, or Firm*—Martine Penilla & Gencarella, LLP

(57) ABSTRACT

A crystalline glass with a characteristic of precipitating crystals from the surface of the crystalline glass to the interior thereof when it is being heated at a temperature higher than the softening point is used in the invention. A plurality of small crystalline glass masses 12 are accumulated and leveled in a fireproof mold coated with a mold release agent, and two crystalline glass plates 14A and 14B cut in an S shape are placed on the accumulated surface of the small crystalline glass masses 12 with the cut faces tightly bonded. A heat treatment is then performed to obtain a crystallized glass article having patterns. The crystalline glass plate can be cut into any shape to tightly bond the cut faces, and therefore the obtained crystallized glass articles have different patterns like natural-marble-like patterns, human figure patterns, animal patterns, etc. The invention also discloses a method of producing crystallized articles having patterns.

4 Claims, 3 Drawing Sheets

CRYSTALLIZED GLASS ARTICLE HAVING PATTERNS AND METHOD OF PRODUCING THE SAME

BACKGROUND OF THE INVENTION a) Field of the Invention

The invention relates to a crystallized glass article and a method of producing such crystallized glass article, more particularly, to a crystallized glass article having patterns that can be used as an interior or exterior building material, or as a panel material used in office desks or furniture, and to a method of producing such crystallized glass article having patterns.

b) Description of the Related Art

As mentioned in the above paragraph, crystallized glass articles with patterns formed thereon are in demand as materials used in buildings, furniture, and office desks. As such, various materials have been proposed in the past to constitute such crystallized glass, for example, Japanese Patent Publication No. S53-39884 disclosed a crystallized glass containing precipitated β-wollastonite (β-$CaO.SiO_2$) type crystals; Japanese Unexamined Patent Publication No. H03-205323 disclosed a crystallized glass containing precipitated diopside ($CaO.MgO.2SiO_2$) type crystals; and Japanese Unexamined Patent Publication No. H06-24768 disclosed a crystallized glass containing precipitated β-wollastonite (β-$CaO.SiO_2$) type and diopside ($CaO.MgO.2SiO_2$) type crystals.

However, the aforementioned crystallized glasses are made into crystallized glass articles with natural-marble-like surfaces by accumulation where crystallization is achieved by heating a plurality of small crystalline glass masses accumulated in a fireproof molding box. The accumulation method is used because none of the aforementioned crystallized glasses includes a nucleating agent, which means that crystals would precipitate almost vertically from the surface of the crystalline glass into the interior thereof. This type of crystallized glass, namely the surface-crystallized glass, would not have patterns shown on its surface even if it were crystallized by heat treatment after being rolled and pressed into a glass plate; thus, a natural-marble-like pattern cannot be obtained.

On the other hand, in making natural-marble-like crystallized glass articles by accumulation, a plurality of small crystalline glass masses are fusion-bonded, forming crystallized glass, and since the crystals in the crystallized glass are confined to the shape of the small crystalline glass masses and patterns vary with the presence and different directions of the crystals, the patterns formed are small and lack varieties.

SUMMARY OF THE INVENTION

It is an object of the invention to provide a crystallized glass article having patterns and a method of producing the same, wherein the patterns are large, colorful, dynamic, and free spirit.

A crystallized glass article having patterns according to the invention comprises one or a plurality of crystalline glass plates that are formed of a crystalline glass material having a characteristic of precipitating crystals from the surface of the crystalline glass material to the interior thereof when the crystalline glass material is heated at a temperature higher than the softening point. Patterns observed on the crystallized glass article are formed by crystals precipitated in the crystalline glass plate(s) softened and/or fusion-bonded at a temperature higher than the softening point, wherein the crystal precipitation varies with the shape and/or the combination of the crystalline glass plate.

Another crystallized glass article having patterns according to the invention comprises a first crystallized glass layer and a second crystallized glass layer. The first crystallized glass layer is formed by one or a plurality of first crystalline glass plates that were softened and/or fusion-bonded and, precipitated crystals therein through a heat treatment; the second crystallized glass layer is stacked on or below the first crystallized glass layer and is formed by a plurality of small crystalline glass masses and/or one or a plurality of second crystalline glass plates that were softened and/or fusion-bonded and, precipitated crystals therein through a heat treatment. The first crystalline glass plate is formed of a crystalline glass material that has a characteristic of precipitating crystals from the surface of the crystalline glass material to the interior thereof when being heated at a temperature higher than the softening point. The crystal precipitation, which the patterns are formed by, varies with the shape of the first crystalline glass plate and/or the combination of the plurality of first crystalline glass plates.

A method of producing crystallized glass articles having patterns according to the invention comprises: providing a first crystalline glass layer which comprises at least one first crystalline glass plate; providing a second crystalline glass layer on or below the first crystalline glass layer, the second crystalline glass layer comprising a plurality of small crystalline glass masses and/or at least one second crystalline glass plate; and performing a heat treatment to fusion-bond the first crystalline glass layer and the second crystalline glass layer into a whole and to precipitate crystals therein to form the crystallized glass article having patterns; wherein the first crystalline glass layer is formed of a crystalline glass material that has a characteristics of precipitating crystals from the surface of the crystalline glass material to the interior thereof when being heated at a temperature higher than the softening point, and the patterns observed on the crystallized glass article are formed by crystals precipitated in the first crystalline glass plate softened and/or fusion-bonded at a temperature higher than the softening point, wherein the crystal precipitation varies with the shape and/or the combination of the first crystalline glass plate.

The crystallized glass article having patterns according to the invention is made of a crystalline glass material having a characteristic of precipitating crystals from the surface of the crystalline glass material to the interior thereof when being heated at a temperature higher than the softening point. When forming a crystallized glass article, if one crystalline glass plate is used, a pattern obtained from the crystalline glass plate that was softened and precipitated crystals at a heating temperature higher than the softening point varies with the shape of the crystalline glass plate, and if a plurality of crystalline glass plates are used, a pattern obtained from the crystalline glass plates that were fusion-bonded and precipitated crystals at a heating temperature higher than the softening point varies with the shape and/or combination of the crystalline glass plates. For the patterns to be seen more clearly, the crystalline glass is preferably to be a crystallized glass containing precipitated β-wollastonite (β-$CaO.SiO_2$) type crystals or a crystallized glass containing precipitated diopside ($CaO.MgO.2SiO_2$) type crystals.

The aforementioned crystallized glass article has patterns that were formed in variation with the shape or combination of the crystalline glass plates, where crystals are precipitated from a deformed portion of the crystalline glass plates to the perimeter thereof or from the interface between the crystalline glass plates to the perimeter thereof, and at portions other than the deformed portion and the interface, crystals are precipitated from the surface of the crystalline glass plates to the backside thereof and from the backside to the surface. Based on the deformed portion and the combined portion, different patterns like natural-marble-like patterns, human figure patterns, and animal patterns can be obtained for the crystallized glass article having patterns.

The crystallized glass article having patterns according to the invention is formed of a first crystallized glass layer and a second crystallized glass layer. Different patterns are presented on the crystallized glass article due to the combination of the two glass layers, especially the shape of a first crystalline glass plate and/or the combination of a plurality of first crystalline glass plates that form the first crystallized glass layer. To obtain a crystallized glass article with such pattern, first, at least one first crystalline glass plate having a characteristic of precipitating crystals from the surface of the crystalline glass material to the interior thereof when being heated at a temperature higher than the softening point is laid on the surface of a plurality of accumulated small crystalline glass masses or on the surface of one second crystalline glass plate or a plurality of stacked second crystalline glass plates. Then, the first crystalline glass plate is fusion-bonded with the small crystalline glass masses and/or the second crystalline glass plate by heat treatment and at the same time, crystals are precipitated from the surface of the small crystalline glass masses to the interior thereof and from the surface of the first crystalline glass plate to the backside thereof and from the backside to the surface, from a deformed portion of the first crystalline glass plate to the perimeter thereof, and from the interface of the first crystalline glass plate to the center of the first crystalline glass plate. Thus, a crystallized glass article having patterns, such as natural-marble-like patterns, human figure patterns, and animal patterns, is obtained. For the patterns to be seen more clearly, the first crystalline glass is preferably to be a crystallized glass containing precipitated β-wollastonite (β-CaO.SiO$_2$) type crystals or a crystallized glass containing precipitated diopside (CaO.MgO.2SiO$_2$) type crystals.

Comparing to the conventional crystallized glass article with patterns, the crystallized glass article having patterns according to the invention is different in that the patterns are more three-dimensional and more vivid, and can be enlarged.

DETAILED DESCRIPTION OF THE INVENTION

Figure 1A:
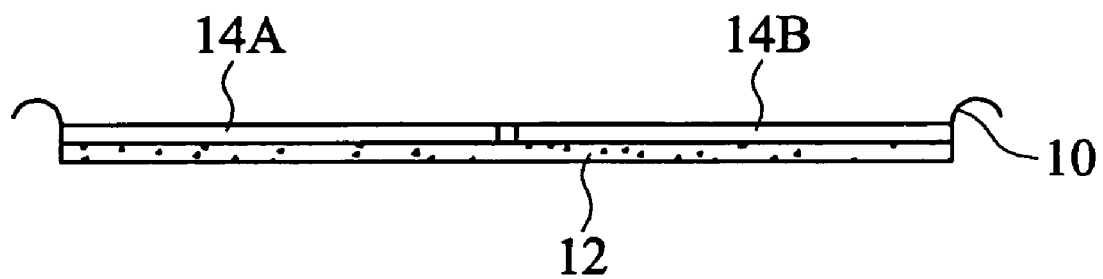
FIG. 1A illustrates a side view of a crystallized glass article having patterns produced by a method according to an embodiment of the invention.

A crystallized glass article having patterns according to the invention is formed of a crystalline glass material having a characteristic of precipitating crystals from the surface of the crystalline glass material to the interior thereof when it is being heated at a temperature higher than the softening point. The crystalline glass having this characteristic is preferably to be a crystallized glass containing precipitated β-wollastonite (β-CaO.SiO$_2$) type crystals or a crystallized glass containing precipitated diopside (CaO.MgO.2SiO$_2$) type crystals. The reason for choosing a crystalline glass that precipitates β-wollastonite (β-CaO.SiO$_2$) type crystals or diopside type (CaO.MgO.2SiO$_2$) crystals for use in the invention will be described.

The crystallized glass containing precipitated β-wollastonite (β-CaO.SiO$_2$) type crystals and the crystallized glass containing precipitated diopside (CaO.MgO.2SiO$_2$) type crystals are capable of producing crystallized glass articles having patterns like natural-marble-like patterns, human figure patterns, animal patterns, etc. because the crystallized glasses have the characteristics of: precipitating crystals from the surface of small crystalline glass masses to the interior thereof; precipitating crystals from the surface of a crystalline glass plate to the backside thereof and from the backside to the surface; precipitating crystals from a deformed portion of a crystalline glass plate to the perimeter thereof; and precipitating from the interface between crystalline glass plates to the center of the crystalline glass plates.

Next, a method of producing crystallized glass articles having patterns according to the invention is described.

First, a plurality of small crystalline glass masses, at least one first crystalline glass plate, and at least one second crystalline plate, which have compositions that constitute (a) a crystallized glass containing precipitated β-wollastonite (β-CaO.SiO$_2$) type crystals or (b) a crystallized glass containing precipitated diopside (CaO.MgO.2SiO$_2$) type crystals, are prepared. Second, a plurality of small crystalline glass masses, at least one first crystalline glass plate, and at least one second crystalline glass plate, which have compositions for forming (c) a crystallized glass containing precipitated crystals, are prepared. The glasses of (a) and (b) are surface-crystallized type crystalline glasses that are softened and deformed while precipitating crystals from the surface of the crystalline glasses to the interior thereof when being heat treated at a temperature higher than the softening point. The small glass masses refer to water-quenched glasses in the form of granulations, powders, small solid spheres, small fragments, rods, and the like.

In the invention, the thickness of the first crystalline glass plate is preferably between 0.1 and 20 mm, more preferably between 1 and 10 mm, and the thickness of the second crystalline glass plate is preferably between 0.1 and 30 mm, more preferably between 1 and 15 mm. One or more than one second crystalline glass plates can be used; however, a plurality thereof is preferred if strength is a consideration and the second crystalline glass plate has a composition that constitutes (a), (b), or (c), where (c) is the surface-crystallized type crystalline glass in which the crystalline glass is softened and deformed and precipitates crystals from the surface of the crystalline glass to the interior thereof at a temperature higher than the softening point during a heat treatment. One or more than one crystalline glass plates having a composition that constitutes other than this type of crystallized glass can also be used, and one thereof is preferably to be used.

In addition, at least one glass plate with desired shape formed by a crystalline glass with a composition that constitutes (a) or (b) is prepared. The crystalline glasses of (a) and (b) have a characteristic of precipitating crystals from the surface of the crystalline glass plate to the backside thereof and from the backside to the surface when the glasses are heat treated at a temperature higher than the softening point; these glasses are so-called the surface-crystallized type crystalline glasses. This type of crystalline glass has a characteristic of, when a plurality of crystalline glass plates are combined and heat treated, precipitating crystals from the surface of the crystalline glass plates to the backside thereof and from the backside to the surface and, at the same time, precipitating crystals from the interface between the crystalline glass plates to the center of the crystalline glass plates.

The crystallized glass article having patterns according to the invention can be produced by the methods listed below.

1. At least one crystalline glass plate composed of (a) or (b) and formed in a desired shape is placed in a fireproof mold coated with a mold release agent.
2. A plurality of small crystalline glass masses are accumulated in a fireproof mold coated with a mold release agent, and at least one crystalline glass plate composed of (a) or (b) and formed in a desired shape is placed on the accumulated surface of the small glass masses.
3. At least one crystalline glass plate is placed in a fireproof mold coated with a mold release agent, and on the surface of the crystalline glass plate, at least one crystalline glass plate composed of (a) or (b) and formed in a desired shape is placed.
4. At least one crystalline glass plate composed of (a) or (b) and formed in a desired shape is placed in a fireproof mold coated with a mold release agent, and a plurality of small crystalline glass masses are accumulated on the surface of the crystalline glass plate.
5. At least one crystalline glass plate composed of (a) or (b) and formed in a desired shape is placed in a fireproof mold coated with a mold release agent, and on the surface of the crystalline glass plate, at least one crystalline glass plate is placed.

In any of the aforementioned five methods, the small crystalline glass masses and the crystalline glass plate are softened and fusion-bonded into a whole by heat treatment at a temperature higher than the softening point of the glass that composes the crystalline glass plate and the small crystalline glass masses, during which β-wollastonite (β-CaO.SiO$_2$) crystals or diopside (CaO.MgO.2SiO$_2$) crystals are precipitated from the surface of the crystalline glass plate to the backside thereof and from the backside to the surface; from a deformation portion of the crystalline glass plate to the perimeter thereof; and from the interface between crystalline glass plates to the center of the crystalline glass plates. Patterns vary with the presence and directions of the crystals and the shape and combination of the glass plates, and thereby crystallized glass layers with different patterns thereon are formed.

Figure 1B:
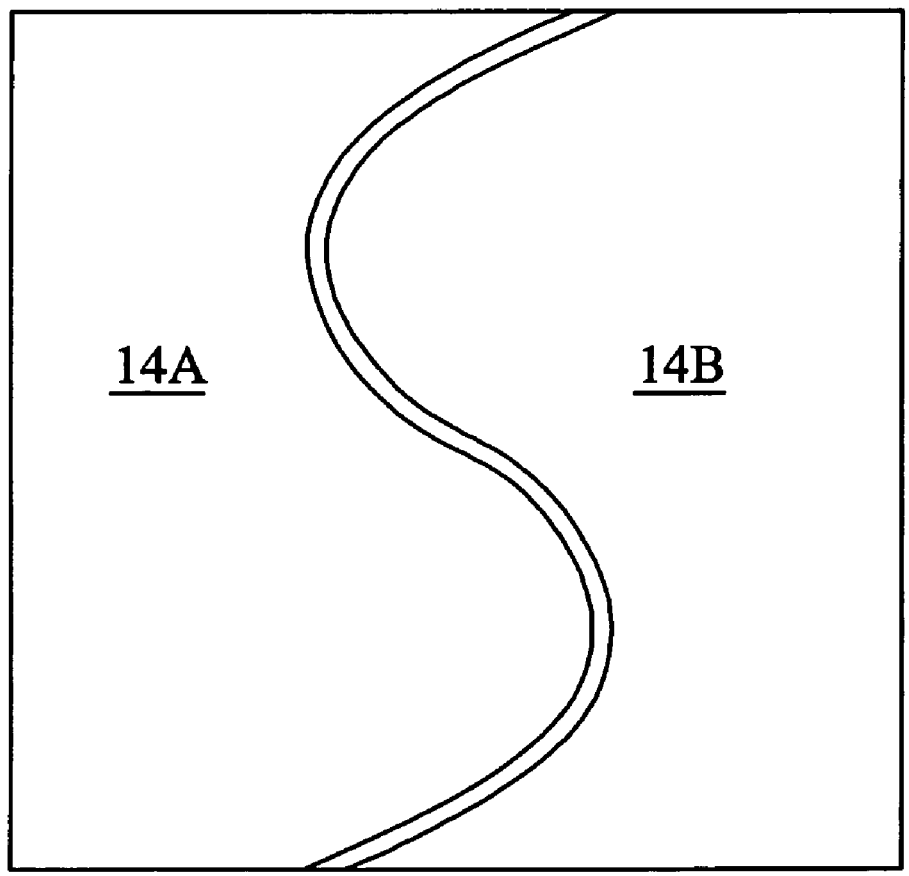
FIG. 1B is a schematic plan view of FIG. 1A.

A combination of a plurality of crystalline glass plates according to an embodiment of the invention is shown in FIG. 1. FIG. 1A is a side view and FIG. 1B is a plan view of the crystalline glass plates. Referring to FIG. 1, a plurality of small crystalline glass masses 12 are accumulated in a fireproof mold 10 coated with a mold release agent, and on the accumulated surface, two crystalline glass plates 14A and 14B that are cut into an S shape are placed, wherein the cut faces of the crystalline glass plates 14A and 14B are tightly bonded and are heat treated as such.

After the crystalline glass plates are cut into desired shapes, they can be heat treated with the cut faces placed tightly bonded to each other or with a gap filled with small crystalline glass masses between the cut faces. In other words, at least a portion of the peripheries of adjacent crystalline glass plates is tightly bonded or a gap that is filled with small crystalline glass masses exists between at least a portion of the peripheries of adjacent crystalline glass plates.

Figure 2A:
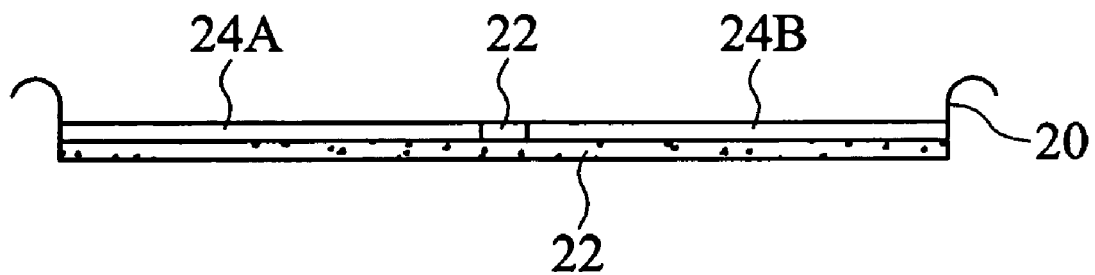
FIG. 2A illustrates a side view of a crystallized glass article having patterns produced by a method according to another embodiment of the invention.
Figure 2B:
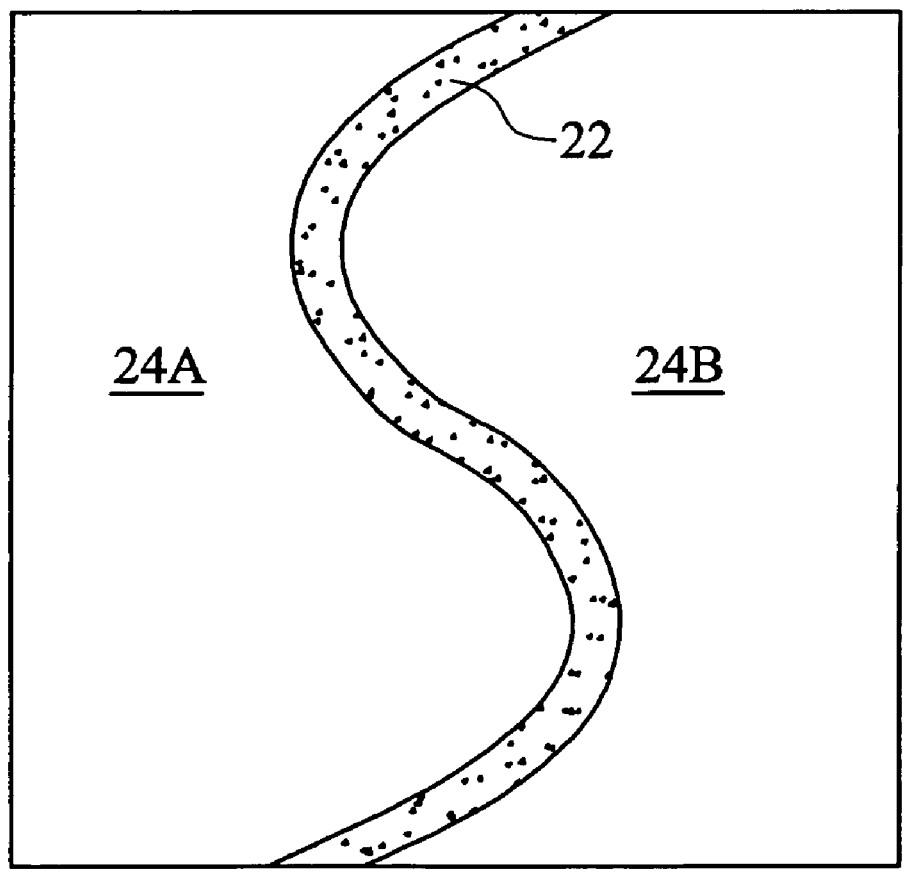
FIG. 2B is a schematic plan view of FIG. 2A.

A fireproof mold 20, a plurality of small crystalline glass masses 22, and two crystalline glass plates 24A and 24B are shown in FIG. 2, wherein a gap filled with the small crystalline glass masses 22 is between the cut faces of the crystalline glass plates 24A and 24B; the heat treatment can also be performed to such an arrangement of the crystalline glass plates.

It is important to combine the small glass masses, the first glass plate, and the second glass plate such that their coefficients of thermal expansion are approximately the same after heat treatment, and the difference between the coefficients of thermal expansion is preferably between 0 and 10×10$^{-7}$/° C., more preferably between 0 and 3×10$^{-7}$/° C. The temperature for heat treatment is preferably between 1030° C. and 1130° C., more preferably between 1050° C. and 1100° C. The heating rate is preferably between 60° C./hr and 600° C./hr, more preferably between 60° C./hr and 360° C./hr.

The aforementioned embodiment described a crystallized glass article formed by laminating a second crystallized glass layer fusion-bonded from a plurality of small crystalline glass masses with a first crystallized glass layer formed of a crystalline glass plate. However, the invention can also be formed by laminating a second crystallized glass layer fusion-bonded from a plurality of small crystalline glass masses, between two first crystallized glass layers formed of first crystalline glass plates, forming a sandwich structure. In addition, the plurality of small crystalline glass masses may be substituted by a plurality of second crystalline glass plates stacked together.

A preferred composition of the first crystallized glass layer, the second crystallized glass layer, the small crystalline glass masses, the first crystalline glass plate, and the second crystalline glass plate that form the crystallized glass article having patterns of the invention is described below.

1. A crystallized glass containing precipitated β-wollastonite (β-CaO.SiO$_2$) type crystals comprises 50-65 wt. % of SiO$_2$; 3-13 wt. % of Al$_2$O$_3$; 15-25 wt. % of CaO; and 2-10 wt. % of ZnO, or may add less than 5 wt. % of a coloring oxide to this composition.

2. A crystallized glass containing precipitated β-wollastonite (β-CaO.SiO$_2$) type crystals comprises 45-75 wt. % of SiO$_2$; 1-13 wt. % of Al$_2$O$_3$; 6-14.5 wt. % of CaO; 1-13 wt. % of Na$_2$O+K$_2$O; 0-20 wt. % of BaO; 0-18 wt. % of ZnO; and 4-24 wt. % of BaO+ZnO, or may add less than 10 wt. % of a coloring oxide to this composition.

3. A crystallized glass containing precipitated β-wollastonite (β-CaO.SiO$_2$) type crystals comprises 45-75 wt. % of SiO$_2$; 1-15 wt. % of Al$_2$O$_3$; 8-20 wt. % of CaO; 1-15 wt. % of Na$_2$O+K$_2$O; 0-18 wt. % of BaO; 0-18 wt. % of ZnO; 4-25 wt. % of BaO+ZnO; 2-8 wt. % of Fe$_2$O$_3$; 0.1-7 wt. % of TiO$_2$; 0.1-5 wt. % of MnO$_2$, 0-2 wt. % of CoO; 0-3 wt. % of B$_2$O$_3$; 0-1 wt. % of As$_2$O$_3$; and 0-1 wt. % of Sb$_2$O$_3$.

4. A crystallized glass containing precipitated β-wollastonite (β-CaO.SiO$_2$) type crystals comprises 48-68 wt. % of SiO$_2$; 0.5-17 wt. % of Al$_2$O$_3$; 6-22 wt. % of CaO; 5-22 wt. % of Na$_2$O+K$_2$O; 0.2-8 wt. % of MgO; 0-8 wt. % of BaO; 0-9 wt. % of ZnO; <15 wt. % of BaO+ZnO; 0-6 wt. % of B$_2$O$_3$; and 0-10 wt. % of a coloring oxide.

5. A crystallized glass containing precipitated β-wollastonite (β-CaO.SiO$_2$) type crystals comprises 40-75 wt. % of SiO$_2$; 2-15 wt. % of Al$_2$O$_3$; 3-15 wt. % of CaO; 0-15 wt. % of ZnO; 0-20 wt. % of BaO; 0-10 wt. % of B$_2$O$_3$; 2-20 wt. % of Na$_2$O+K$_2$O+Li$_2$O; 0-10 wt. % of a coloring oxide; 0-1% of As$_2$O$_3$; and 0-1 wt. % of Sb$_2$O$_3$.

6. A crystallized glass containing precipitated diopside (CaO.MgO.2SiO$_2$) type crystals comprises 45-75 wt. % of SiO$_2$; 1-25 wt. % of Al$_2$O$_3$; 1-12.5 wt. % of CaO; 0.5-12 wt. % of MgO; 1.5-13 wt. % of CaO+MgO; 0-18 wt. % of BaO; 0-18 wt. % of ZnO; 1-15 wt. % of Na$_2$O; 0-7 wt. % of K$_2$O;

0-5 wt. % of $Li_2O$; 0-10 wt. % of $B_2O_3$; 0-10 wt. % of $P_2O_5$; 0-10 wt. % of a coloring oxide; 0-1 wt. % of $As_2O_3$; and 0-1 wt. % of $Sb_2O_3$.

7. A crystallized glass containing precipitated β-wollastonite (β-$CaO.SiO_2$) type crystals comprises 40-75 wt. % of $SiO_2$; 2-15 wt. % of $Al_2O_3$; 3-20 wt. % of CaO; 0-15 wt. % of ZnO; 0-20 wt. % of BaO; 0-10 wt. % of $B_2O_3$; 2-20 wt. % of $Na_2O+K_2O+Li_2O$; 0-10 wt. % of a coloring oxide; 0-1% of $As_2O_3$; and 0-1 wt. % of $Sb_2O_3$.

8. A crystallized glass containing precipitated diopside ($CaO.MgO.2SiO_2$) type crystals comprises 45-75 wt. % of $SiO_2$; 1-25 wt. % of $Al_2O_3$; 1-20 wt. % of CaO; 0.5-17 wt. % of MgO; 0-18 wt. % of BaO; 0-18 wt. % of ZnO; 1-15 wt. % of $Na_2O$; 0-7 wt. % of $K_2O$; 0-5 wt. % of $Li_2O$; 0-10 wt. % of $B_2O_3$; 0-10 wt. % of $P_2O_5$; 0-10 wt. % of a coloring oxide; 0-1% of $As_2O_3$; and 0-1 wt. % of $Sb_2O_3$.

9. A crystallized glass containing precipitated β-wollastonite (β-$CaO.SiO_2$) type crystals comprises 45-70 wt. % of $SiO_2$; 1-13 wt. % of $Al_2O_3$; 6-25 wt. % of CaO; 0.1-20 wt. % of $Na_2O+K_2O+Li_2O$; 0-20 wt. % of BaO; 0-18 wt. % of ZnO; 4-24 wt. % of BaO+ZnO; and 0-10 wt. % of each coloring oxide in the group of $V_2O_5$, $Cr_2O_3$, $MnO_2$, $Fe_2O_3$, CoO, NiO, and CuO.

10. A crystallized glass containing precipitated diopside ($CaO.MgO.2SiO_2$) type crystals comprises 45-75 wt. % of $SiO_2$; 1-25 wt. % of $Al_2O_3$; 1-20 wt. % of CaO; 0.5-17 wt. % of MgO; 0-18 wt. % of BaO; 0-18 wt. % of ZnO; 1-15 wt. % of $Na_2O$; 0-7 wt. % of $K_2O$; 0-5 wt. % of $Li_2O$; 0-10 wt. % of $B_2O_3$; 0-10 wt. % of $P_2O_5$; 0-1% of $As_2O_3$; and 0-1 wt. % of $Sb_2O_3$; and at least one coloring oxide selected from the group of $V_2O_5$, $Cr_2O_3$, $MnO_2$, $Fe_2O_3$, CoO, NiO, and CuO, amounting to 0-10 wt. %.

11. A crystallized glass containing precipitated β-wollastonite (β-$CaO.SiO_2$) type crystals comprises 45-75 wt. % of $SiO_2$; 1-15 wt. % of $Al_2O_3$; 6-20 wt. % of CaO; 1-15 wt. % of $Na_2O+K_2O$; 0-18 wt. % of BaO; 0-18 wt. % of ZnO; 4-25 wt. % of BaO+ZnO; 0.05-5 wt. % of NiO; and 0.01-5 wt. % of CoO.

12. A crystallized glass containing precipitated β-wollastonite (β-$CaO.SiO_2$) type crystals comprises 50-75 wt. % of $SiO_2$; 1-15 wt. % of $Al_2O_3$; 6-16.5 wt. % of CaO; 0.1-5 wt. % of $Li_2O$; 0-1.5 wt. % of $B_2O_3$; 10-17.5 wt. % of $CaO+Li_2O+B_2O_3$; 2.5-12 wt. % of ZnO; 0-12 wt. % of BaO; 0.1-15 wt. % of $Na_2O+K_2O$; 0-1 wt. % of $As_2O_3$; 0-1 wt. % of $Sb_2O_3$; 0-1.5 wt. % of MgO; 0-1.5 wt. % of SrO; 0-1 wt. % of $TiO_2$; 0-1 wt. % of $ZrO_2$; 0-1 wt. % of $P_2O_5$; and 0-10 wt. % of at least one coloring oxide in the group of $V_2O_5$, $Cr_2O_3$, $MnO_2$, $Fe_2O_3$, CoO, NiO, and CuO.

13. A crystallized glass containing precipitated β-wollastonite (β-$CaO.SiO_2$) type crystals or diopside ($CaO.MgO.2SiO_2$) type crystals comprises 45-77 wt. % of $SiO_2$; 1-25 wt. % of $Al_2O_3$; 2-25 wt. % of CaO; 0-18 wt. % of ZnO; 0-20 wt. % of BaO; 0-17 wt. % of MgO; 1-15 wt. % of $Na_2O$; 0-7 wt. % of $K_2O$; 0-5 wt. % of $Li_2O$; 0-1.5 wt. % of $B_2O_3$; 0-10 wt. % of coloring oxide ($V_2O_5$, $Cr_2O_3$, $MnO_2$, $Fe_2O_3$, CoO, NiO, and CuO); 0-1 wt. % of $As_2O_3$; 0-1 wt. % of $Sb_2O_3$; 0-1.5 wt. % of SrO; 0-1 wt. % of $TiO_2$; 0-1 wt. % of $ZrO_2$; and 0-1 wt. % of $P_2O_5$.

EXAMPLE 1

First, 65.1 wt. % of $SiO_2$, 6.6 wt. % of $Al_2O_3$, 12.0 wt. % of CaO, 3.3 wt. % of $Na_2O$, 2.3 wt. % of $K_2O$, 4.1 wt. % of BaO, and 6.6 wt. % of ZnO of glass raw material are mixed and melted at 1500° C. for 16 hours. Second, the molten glass is made into a plate by roll-out method, obtaining a glass plate with a thickness of 10 mm. A letter Z is engraved 5 mm deep into the center of the glass plate. The glass plate is crystalline glass which after heat treatment can be a white crystallized glass containing precipitated β-wollastonite (β-$CaO.SiO_2$) type crystals and having a coefficient of thermal expansion of 65×$10^{-7}$/C between 30 and 380° C.

Third, one crystalline glass plate with the letter Z is placed in a fireproof mold coated with a mold release agent, at 1100° C. for 2 hours with a heating rate of 120° C./hr, whereby a crystallized glass article having a letter Z pattern is obtained.

Thus, the obtained crystallized glass article is approximately 10 mm thick and a natural-marble-like pattern illustrating a white letter Z is observed after the surface is polished. The letter Z pattern is approximately 5 mm deep. Comparing to the conventional crystallized glass article with white natural-marble-like surface patterns, the crystallized glass article having natural-marble-like surface patterns with a white letter Z is more three-dimensional. The X-ray test result shows that the primary crystal precipitated is β-wollastonite (β-$CaO.SiO_2$). Moreover, the transparence of the crystallized glass article is seemingly more distinct after being polished on both sides.

EXAMPLE 2

First, 65.1 wt. % of $SiO_2$, 6.6 wt. % of $Al_2O_3$, 12.0% of CaO, 3.3 wt. % of $Na_2O$, 2.3 wt. % of $K_2O$, 4.1 wt. % of BaO, and 6.6 wt. % of ZnO of glass raw material are mixed and melted at 1500° C. for 16 hours. Second, the molten glass is made into a plate by roll-out method, obtaining a glass plate with a thickness of 10 mm. The glass plate is crystalline glass which after heat treatment can be a white crystallized glass containing precipitated β-wollastonite (β-$CaO.SiO_2$) type crystals and having a coefficient of thermal expansion of 65×$10^{-7}$/° C. between 30 and 380° C.

Third, the prepared crystalline glass plate is cut with a water knife along an S curve, resulting in two crystalline glass plates.

At last, the two crystalline glass plates are placed in a fireproof mold coated with a mold release agent, in which the cut surfaces of the crystalline glass plates are tightly bonded and form the S curve, and then heat-treated at 1100° C. for 2 hours with a heating rate of 120° C./hr, whereby a crystallized glass article having an S curve pattern is obtained.

Thus, the obtained crystallized glass article is approximately 10 mm thick and a natural-marble-like pattern illustrating a white S curve is observed after the surface is polished. The S curve pattern is approximately 10 mm deep. Comparing to the conventional crystallized glass article with white natural-marble-like surface patterns, the crystallized glass article having natural-marble-like surface patterns with a white S curve is more three-dimensional. The X-ray test result shows that the primary crystal precipitated is β-wollastonite (β-$CaO.SiO_2$). Moreover, the transparence of the crystallized glass article is seemingly more distinct after being polished on both sides.

EXAMPLE 3

First, 51.0 wt. % of $SiO_2$, 19.0 wt. % of $Al_2O_3$, 4.7 wt. % of MgO, 4.1 wt. % of ZnO, 2.2 wt. % of $TiO_2$, 1.5 wt. % of $ZrO_2$, 6.0 wt. % of $B_2O_3$, 8.5 wt. % of $Na_2O$, 2.8 wt. % of $K_2O$, and 0.2% of CaO of glass raw material are mixed and melted at 1500° C. for 16 hours. Second, the molten glass is made into a plate by roll-out method, obtaining a glass plate with a thickness of 10 mm. The glass plate is crystalline glass which after heat treatment can be a white crystallized glass containing precipitated forsterite ($2MgO \cdot SiO_2$) type crystals and having a coefficient of thermal expansion of $67 \times 10^{-7}/°$ C. between 30 and 380° C.

Next, 65.1 wt. % of $SiO_2$, 6.6 wt. % of $Al_2O_3$, 12.0% of CaO, 3.3 wt. % of $Na_2O$, 2.3 wt. % of $K_2O$, 4.1 wt. % of BaO, and 6.6 wt. % of ZnO of glass raw material are mixed and melted at 1500° C. for 16 hours. Then, the molten glass is made into a plate by roll-out method, obtaining a glass plate with a thickness of 5 mm. The glass plate is crystalline glass which after heat treatment can be a white crystallized glass containing precipitated β-wollastonite (β-$CaO \cdot SiO_2$) type crystals and having a coefficient of thermal expansion of $65 \times 10^{-7}/°$ C. between 30 and 380° C. The prepared crystalline glass plate is then cut with a water knife along an S curve, resulting in two crystalline glass plates.

Subsequently, the prepared second crystalline glass plate for precipitating forsterite ($2MgO \cdot SiO_2$) type crystals is placed in a fireproof mold coated with a mold release agent; the thickness of the second crystalline glass plate is approximately 10 mm. The two aforementioned prepared first crystalline glass plates for precipitating β-wollastonite (β-$CaO \cdot SiO_2$) type crystals are placed on and fully cover the surface of the second crystalline glass plate, in which the cut surfaces of the first crystalline glass plates are tightly bonded and form the S curve. At 1100° C. for 2 hours with a heating rate of 120° C./hr, the second and first crystalline glass plates are softened and fusion-bonded and, precipitate crystals therein, whereby a crystallized glass article is formed by integrating a second crystallized glass layer transformed from the second crystalline glass plate and a first crystallized glass layer transformed from the two first crystalline glass plates. At where the two first crystalline glass plates are fusion-bonded in the first crystallized glass layer, β-wollastonite (β-$CaO \cdot SiO_2$) type crystals are precipitated from the interface between the glass plates to the center of the glass plates at a faster speed than β-wollastonite (β-$CaO \cdot SiO_2$) crystals precipitated outside of the interface, and therefore the interface resulted with a more distinct color. For the portions outside of the interface between the glass plates, β-wollastonite (β-$CaO \cdot SiO_2$) crystals are precipitated from the surface of the glass plate to the backside thereof and simultaneously from the backside of the glass plate to the surface thereof.

Thus, the obtained white crystallized glass article is approximately 15 mm thick and a natural-marble-like pattern illustrating an S curve is observed after the surface is polished. The S curve pattern is approximately 5 mm deep. Comparing to the conventional crystallized glass article with patterns, the crystallized glass article having natural-marble-like surface patterns with a white S curve is more three-dimensional. Moreover, the X-ray test result shows that the second crystallized glass layer contains precipitated forsterite ($2MgO \cdot SiO_2$) type crystals and the first crystallized glass layer contains precipitated β-wollastonite (β-$CaO \cdot SiO_2$) type crystals.

EXAMPLE 4

First, 65.1 wt. % of $SiO_2$, 6.6 wt. % of $Al_2O_3$, 12.0% of CaO, 3.3 wt. % of $Na_2O$, 2.3 wt. % of $K_2O$, 4.1 wt. % of BaO, and 6.6 wt. % of ZnO of glass raw material are mixed and melted at 1500° C. for 16 hours. Then, the molten glass is water quenched, dried, and classified to obtain small glass masses with particle size in a range of 1-3 mm. The small glass masses are crystalline glass which after heat treatment can be a white crystallized glass containing precipitated β-wollastonite (β-$CaO \cdot SiO_2$) type crystals and having a coefficient of thermal expansion of $65 \times 10^{-7}/°$ C. between 30 and 380° C.

Next, 65.1 wt. % of $SiO_2$, 6.6 wt. % of $Al_2O_3$, 12.0% of CaO, 3.3 wt. % of $Na_2O$, 2.3 wt. % of $K_2O$, 4.1 wt. % of BaO, and 6.6 wt. % of ZnO of glass raw material are mixed and melted at 1500° C. for 16 hours. Then, the molten glass is made into a plate by roll-out method, obtaining a glass plate with a thickness of 5 mm. The glass plate is crystalline glass which after heat treatment can be a white crystallized glass containing precipitated β-wollastonite (β-$CaO \cdot SiO_2$) type crystals and having a coefficient of thermal expansion of $65 \times 10^{-7}/°$ C. between 30 and 380° C. The glass plate is then cut with a water knife along an S curve, resulting in two glass plates.

Subsequently, the prepared small glass masses are accumulated in a fireproof mold coated with a mold release agent; the thickness of the accumulated small glass masses is approximately 12 mm. The two aforementioned prepared crystalline glass plates are placed on and fully cover the leveled surface of the accumulated small glass masses, in which the cut surfaces of the crystalline glass plates are tightly bonded and form the S curve. At 1100° C. for 2 hours with a heating rate of 120° C./hr, the plurality of small glass masses and the two glass plates are softened and fusion-bonded while precipitating crystals therein to form a second crystallized glass layer and an overhead first crystallized glass layer, respectively, whereby a crystallized glass article is formed by integrating the second crystallized glass layer and the first crystallized glass layer.

Figure 3:
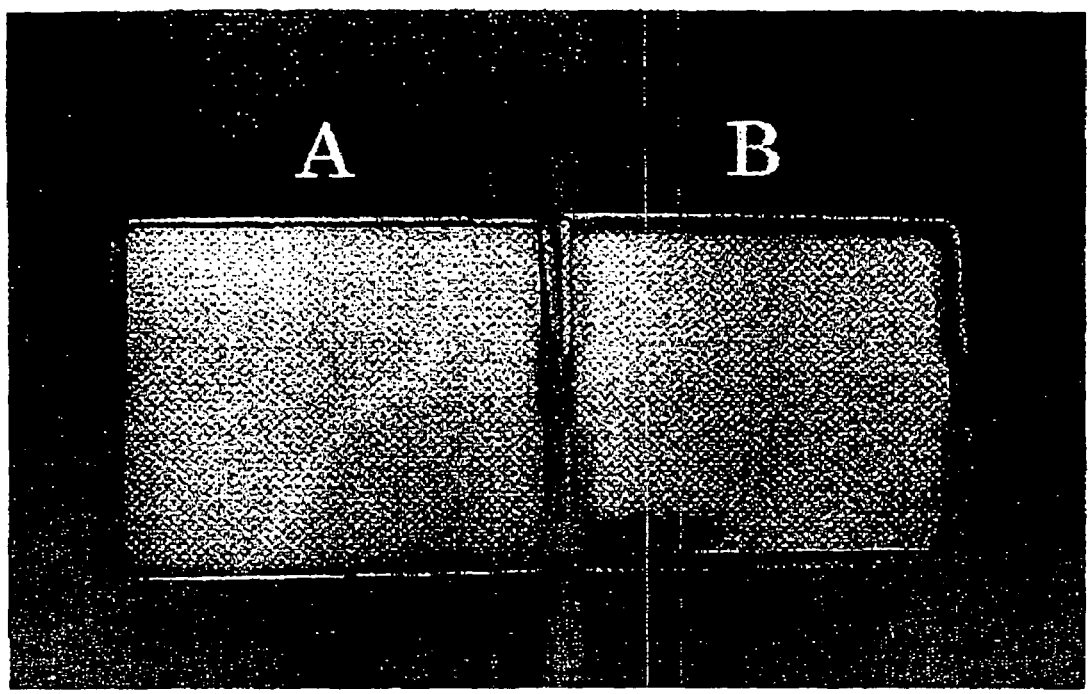
FIG. 3 is a photograph of a crystallized glass article having patterns according to Example 4 of the invention and a conventional crystallized glass article.

Thus, the obtained crystallized glass article is approximately 16 mm thick and a natural-marble-like pattern illustrating an S curve, like Article A shown in FIG. 3, is observed after the surface is polished. The S curve pattern is approximately 5 mm deep. Comparing to the conventional crystallized glass article with white natural-marble-like surface patterns (Article B shown in FIG. 3), the crystallized glass article having natural-marble-like surface patterns with a white S curve is more three-dimensional. The X-ray test result shows that both the second crystallized glass layer and the first crystallized glass layer contain precipitated β-wollastonite (β-$CaO \cdot SiO_2$) type crystals. Moreover, the transparence of the crystallized glass article is seemingly more distinct after being polished on both sides.

In addition, the conventional crystallized glass article with white natural-marble-like patterns that is shown in FIG. 3 as Article B is obtained by accumulating prepared small glass masses in a fireproof mold coated with a mold release agent, leveling the accumulated small glass masses, and then heating and polishing thereof.

EXAMPLE 5

First, 65.1 wt. % of $SiO_2$, 6.6 wt. % of $Al_2O_3$, 12.0% of CaO, 3.3 wt. % of $Na_2O$, 2.3 wt. % of $K_2O$, 4.1 wt. % of BaO, and 6.6 wt. % of ZnO of glass raw material are mixed and melted at 1500° C. for 16 hours. Then, the molten glass is water quenched, dried, and classified to obtain small glass masses with particle size in a range of 1-3 mm. The small glass masses are crystalline glass which after heat treatment can be a white crystallized glass containing precipitated β-wollastonite (β-$CaO \cdot SiO_2$) type crystals and having a coefficient of thermal expansion of $65 \times 10^{-7}/$C between 30 and 380° C.

Next, 65.1 wt. % of $SiO_2$, 6.6 wt. % of $Al_2O_3$, 12.0% of CaO, 3.3 wt. % of $Na_2O$, 2.3 wt. % of $K_2O$, 4.1 wt. % of BaO, and 6.6 wt. % of ZnO of glass raw material are mixed and melted at 1500° C. for 16 hours. Then, the molten glass is made into a plate by roll-out method, obtaining a glass plate with a thickness of 5 mm. The glass plate is crystalline glass which after heat treatment can be a white crystallized glass containing precipitated β-wollastonite (β-CaO.SiO$_2$) type crystals and having a coefficient of thermal expansion of $65 \times 10^{-7}$/C between 30 and 380° C. The glass plate is then cut with a water knife along an S curve, resulting in two glass plates.

Subsequently, the two prepared glass plates are placed in a fireproof mold coated with a mold release agent with the cut faces tightly bonded to form the S letter curve. The prepared small glass masses are accumulated on and fully cover the surface of the two glass plates; the thickness of the accumulated small glass masses is approximately 12 mm after they are leveled. At 1100° C. for 2 hours with a heating rate of 120° C./hr, the two glass plates and the plurality of small glass masses are softened and fusion-bonded while precipitating crystals therein to form a first crystallized glass layer and an overhead second crystallized glass layer, respectively, whereby a crystallized glass article is formed by integrating the second crystallized glass layer and the first crystallized glass layer.

Thus, the obtained crystallized glass article is approximately 16 mm thick and a natural-marble-like pattern illustrating a white S curve is observed after the backside is polished. The S curve pattern is approximately 5 mm deep. Comparing to the conventional crystallized glass article with white natural-marble-like surface patterns, the crystallized glass article having natural-marble-like surface patterns with a white S curve is more three-dimensional. The X-ray test result shows that both the second crystallized glass layer and the first crystallized glass layer contain precipitated β-wollastonite (β-CaO.SiO$_2$) type crystals. Moreover, the transparency of the crystallized glass article is seemingly more distinct after both sides are polished.

EXAMPLE 6

First, 62.2 wt. % of SiO$_2$, 5.9 wt. % of Al$_2$O$_3$, 12.9% of CaO, 4.6 wt. % of Na$_2$O, 2.1 wt. % of K$_{20}$, 1.0 wt. % of Li$_2$O, 6.0 wt. % of BaO, 5.2 wt. % of ZnO, and 0.1 wt. % of NiO of glass raw material are mixed and melted at 1450° C. for 16 hours. Then, the molten glass is water quenched, dried, and classified to obtain small glass masses with particle size in a range of 3-7 mm. The small glass masses are crystalline glass which after heat treatment can be a yellowish-beige crystallized glass containing precipitated β-wollastonite (β-CaO-.SiO$_2$) type crystals and having a coefficient of thermal expansion of $69 \times 10^{-7}$/° C. between 30 and 380° C.

Next, 62.2 wt. % of SiO$_2$, 5.9 wt. % of Al$_2$O$_3$, 12.9% of CaO, 4.6 wt. % of Na$_2$O, 2.1 wt. % of K$_{20}$, 1.0 wt. % of Li$_2$O, 6.0 wt. % of BaO, 5.2 wt. % of ZnO, and 0.1 wt. % of NiO of glass raw material are mixed and melted at 1450° C. for 16 hours. Then, the molten glass is made into a plate by roll-out method, obtaining a glass plate with a thickness of 3 mm. The glass plate is crystalline glass which after heat treatment can be a yellowish-beige crystallized glass containing precipitated β-wollastonite (β-CaO.SiO$_2$) type crystals and having a coefficient of thermal expansion of $69 \times 10^{-7}$/° C. between 30 and 380° C. The glass plate is then cut with water knife to show the contour of a beautiful lady, resulting in two glass plates.

Subsequently, the prepared small glass masses are accumulated in a fireproof mold coated with a mold release agent; the thickness of the accumulated small glass masses is approximately 14 mm. After leveling the accumulated small glass masses, the two prepared glass plates are placed on and fully cover the surface of the small glass masses with the cut faces tightly bonded to form the contour of a beautiful lady. At 1050° C. for 2 hours with a heating rate of 120° C./hr, a plurality of the small glass masses and the two crystalline glass plates B are softened and fusion-bonded while precipitating crystals therein to form a second crystallized glass layer and an overhead first crystallized glass layer, respectively, whereby a crystallized glass article is formed by integrating the second crystallized glass layer and the first crystallized glass layer. At where the two first crystalline glass plates are fusion-bonded, β-wollastonite (β-CaO.SiO$_2$) type crystals are precipitated from the interface between the glass plates to the center of the glass plates at a faster speed than β-wollastonite (β-CaO.SiO$_2$) crystals precipitated outside of the interface, and therefore the interface resulted with a more distinct color. For the portions outside of the interface between the glass plates, β-wollastonite (β-CaO.SiO$_2$) crystals are precipitated from the surface of the glass plate to the backside thereof and simultaneously from the backside of the glass plate to the surface thereof.

Thus, the obtained yellowish-beige crystallized glass article is approximately 16 mm thick and a natural-marble-like pattern illustrating a human figure, in this case, the contour of a beautiful lady, is observed after the surface is polished. The pattern is approximately 3 mm deep. Comparing to the conventional crystallized glass article with patterns, the crystallized glass article having the contour of a beautiful lady is more three-dimensional. Moreover, the X-ray test result shows that both the second crystallized glass layer and the first crystallized glass layer contain precipitated β-wollastonite (β-CaO.SiO$_2$) type crystals.

EXAMPLE 7

First, 62.0 wt. % of SiO$_2$, 9.0 wt. % of Al$_2$O$_3$, 9.0% of CaO, 4.5 wt. % of MgO, 4.6 wt. % of BaO, 5.0 wt. % of Na$_2$O, 3.0 wt. % of K$_2$O, 0.5 wt. % of B$_2$O$_3$, 2.0 wt. % of P$_2$O$_5$, 0.4 wt. % of Sb$_2$O$_3$, and 0.05 wt. % of CoO of glass raw material are mixed and melted at 1500° C. for 16 hours. Then, the molten glass is water quenched, dried, and classified to obtain small glass masses with particle size in a range of 1-3 mm. The small glass masses are crystalline glass which after heat treatment can be a gray crystallized glass containing precipitated diopside (CaO.MgO.2SiO$_2$) type crystals and having a coefficient of thermal expansion of $71 \times 10^{-7}$/C between 30 and 380° C.

Next, 62.0 wt. % of SiO$_2$, 9.0 wt. % of Al$_2$O$_3$, 9.0% of CaO, 4.5 wt. % of MgO, 4.6 wt. % of BaO, 5.0 wt. % of Na$_2$O, 3.0 wt. % of K$_2$O, 0.5 wt. % of B$_2$O$_3$, 2.0 wt. % of P$_2$O$_5$, 0.4 wt. % of Sb$_2$O$_3$, and 0.05 wt. % of CoO of glass raw material are mixed and melted at 1500° C. for 16 hours. Then, the molten glass is made into a plate by roll-out method, obtaining a glass plate with a thickness of 3 mm. The glass plate is crystalline glass which after heat treatment can be a gray crystallized glass containing precipitated diopside (CaO.MgO.2SiO$_2$) type crystals and having a coefficient of thermal expansion of $71 \times 10^{-7}$/° C. between 30 and 380° C. The glass plate is then cut to show a Mercedes-Benz logo by using a water knife, resulting in three glass plates.

Subsequently, a plurality of the prepared small glass masses are accumulated in a fireproof mold coated with a mold release agent; the thickness of the accumulated small glass masses is approximately 14 mm. After leveling the accumulated small glass masses, the three prepared glass plates are placed on and fully cover the surface of the small glass masses with the cut faces tightly bonded to form the Mercedes-Benz logo. At 1050° C. for 2 hours with a heating rate of 120° C./hr, the plurality of small glass masses and the three crystalline glass plates are softened and fusion-bonded while precipitating crystals therein to form a second crystallized glass layer and an overhead first crystallized glass layer, respectively, whereby a crystallized glass article is formed by integrating the second crystallized glass layer and the first crystallized glass layer. At where the three glass plates are fusion-bonded, diopside ($CaO.MgO.2SiO_2$) type crystals are precipitated from the interface between the glass plates to the center of the glass plates at a faster speed than diopside ($CaO.MgO.2SiO_2$) crystals precipitated outside of the interface, and therefore the interface resulted with a more distinct color. For the portions outside of the interface between the glass plates, diopside ($CaO.MgO.2SiO_2$) type crystals are precipitated from the surface of the glass plate to the backside thereof and simultaneously from the backside of the glass plate to the surface thereof.

Thus, the obtained gray crystallized glass article is approximately 16 mm thick and a fine, magnificent Mercedes-Benz logo is observed after the surface is polished. The pattern is approximately 3 mm deep. Comparing to the conventional crystallized glass article with patterns, the crystallized glass article having the Mercedes-Benz logo pattern is more three-dimensional. Moreover, the X-ray test results shows that both the second crystallized glass layer and the first crystallized glass layer contain precipitated diopside ($CaO.MgO.2SiO_2$) type crystals.

EXAMPLE 8

First, 60.0 wt. % of $SiO_2$, 6.0 wt. % of $Al_2O_3$, 7.6% of CaO, 3.8 wt. % of MgO, 3.5 wt. % of BaO, 6.5 wt. % of ZnO, 3.8 wt. % of $Na_2O$, 2.5 wt. % of $K_2O$, 0.4 wt. % of $Li_2O$, 5.4 wt. % of $B_2O_3$, 0.3 wt. % of $As_2O_3$, and 0.2 wt. % of NiO of glass raw material are mixed and melted at 1500° C. for 16 hours. Then, the molten glass is formed into strips and then crushed and classified to obtain small glass masses with particle size in a range of 1-3 mm. The small glass masses are crystalline glass which after heat treatment can be a yellowish-beige crystallized glass containing precipitated diopside ($CaO.MgO.2SiO_2$) type crystals and having a coefficient of thermal expansion of $73\times10^{-7}$/C between 30 and 380° C.

Next, 60.0 wt. % of $SiO_2$, 6.0 wt. % of $Al_2O_3$, 7.6% of CaO, 3.8 wt. % of MgO, 3.5 wt. % of BaO, 6.5 wt. % of ZnO, 3.8 wt. % of $Na_2O$, 2.5 wt. % of $K_2O$, 0.4 wt. % of $Li_2O$, 5.4 wt. % of $B_2O_3$, 0.3 wt. % of $As_2O_3$, and 0.2 wt. % of NiO of glass raw material are mixed and melted at 1500° C. for 16 hours. Then, the molten glass is made into a plate by roll-out method, obtaining a glass plate with a thickness of 5 mm. The glass plate is crystalline glass which after heat treatment can be a yellowish-beige crystallized glass containing precipitated diopside ($CaO.MgO.2SiO_2$) type crystals and having a coefficient of thermal expansion of $73\times10^{-7}$/° C. between 30 and 380° C. The glass plate is then cut to show a "Jian Quan Glass Development Company Ltd." pattern with a water knife, resulting in several glass plates.

Subsequently, a plurality of the prepared small glass masses are accumulated in a fireproof mold coated with a mold release agent; the thickness of the accumulated small glass masses is approximately 12 mm. After leveling the accumulated small glass masses, the several prepared glass plates are placed on and fully cover the surface of the small glass masses with their cut faces tightly bonded to form the "Jian Quan Glass Development Company Ltd." pattern. At 1000° C. for 4 hours with a heating rate of 60° C./hr, the plurality of small glass masses and the several crystalline glass plates are softened and fusion-bonded while precipitating crystals therein to form a second crystallized glass layer and an overhead first crystallized glass layer, respectively, whereby a crystallized glass article is formed by integrating the second crystallized glass layer and the first crystallized glass layer. At where the several glass plates are fusion-bonded, diopside ($CaO.MgO.2SiO_2$) type crystals are precipitated from the interface between the glass plates to the center of the glass plates at a faster speed than diopside ($CaO.MgO.2SiO_2$) crystals precipitated outside of the interface, and therefore the interface resulted with a more distinct color. For the portions outside of the interface, diopside (($CaO.MgO.2SiO_2$) crystals are precipitated from the surface of the glass plate to the backside thereof and from the backside of the glass plate to the surface thereof.

Thus, the obtained yellowish-beige crystallized glass article is approximately 16 mm thick and a fine, magnificent "Jian Quan Glass Development Company Ltd." pattern is observed after the surface is polished. The pattern is approximately 5 mm deep. Comparing to the conventional crystallized glass article with patterns, the crystallized glass article having the "Jian Quan Glass Development Company Ltd." pattern is more three-dimensional. Moreover, the X-ray test indicates that both of the second crystallized glass layer and the first crystallized glass layer contain precipitated diopside ($CaO.MgO.2SiO_2$) type crystals.

EXAMPLE 9

First, 62.0 wt. % of $SiO_2$, 9.0 wt. % of $Al_2O_3$, 9.0% of CaO, 4.5 wt. % of MgO, 4.6 wt. % of BaO, 5.0 wt. % of $Na_2O$, 3.0 wt. % of $K_2O$, 0.5 wt. % of $B_2O_3$, 2.0 wt. % of $P_2O_5$, 0.4 wt. % of $Sb_2O_3$, and 0.05 wt. % of CoO of glass raw material are mixed and melted at 1500° C. for 16 hours. Then, the molten glass is water quenched, dried, and classified to obtain small glass masses with particle size in a range of 1-3 mm. The small glass masses are crystalline glass which after heat treatment can be a gray crystallized glass containing precipitated diopside ($CaO.MgO.2SiO_2$) type crystals and having a coefficient of thermal expansion of $71\times10^{-7}$/° C. between 30 and 380° C.

Next, 62.2 wt. % of $SiO_2$, 5.9 wt. % of $Al_2O_3$, 12.9% of CaO, 4.6 wt. % of $Na_2O$, 2.1 wt. % of $K_{2O}$, 1.0 wt. % of $Li_2O$, 6.0 wt. % of BaO, and 5.2 wt. % of ZnO of glass raw material are mixed and melted at 1450° C. for 16 hours. Then, the molten glass is made into a plate by roll-out method, obtaining a glass plate with a thickness of 3 mm. The glass plate is crystalline glass which after heat treatment can be a white crystallized glass containing precipitated β-wollastonite (β-$CaO.SiO_2$) type crystals and having a coefficient of thermal expansion of $69\times10^{-7}$/° C. between 30 and 380° C. The glass plate is then cut to show the outline of a flying white crane by using a water knife, and the glass plate remains as one piece.

Subsequently, a plurality of the prepared small glass masses are accumulated in a fireproof mold coated with a mold release agent; the thickness of the accumulated small glass masses is approximately 14 mm. After leveling the accumulated small glass masses, the prepared glass plate is placed at a suitable position on the surface of the small glass masses according to the pattern design, and small glass masses are placed between the periphery of the glass plate and the periphery of the fireproof mold and are leveled. At 1050° C. for 2 hours with a heating rate of 120° C./hr, the plurality of small glass masses are softened and fusion-bonded while precipitating crystals therein to form a second crystallized glass layer, and on the second crystallized glass layer, a first crystallized glass layer is formed by the glass plate and the plurality of small glass masses being softened and fusion-bonded while precipitating crystals, whereby a crystallized glass article is formed by integrating the second crystallized glass layer and the first crystallized glass layer. At where the glass plate and the plurality of small glass masses are fusion-bonded, β-wollastonite (β-CaO.SiO$_2$) type crystals are precipitated from the interface between the glass plate and the small glass masses to the center of the glass plate at a faster rate than β-wollastonite (β-CaO.SiO$_2$) crystals precipitated outside of the interface, and therefore the interface resulted with a more distinct color. For the portions outside the interface, β-wollastonite (β-CaO.SiO$_2$) crystals are precipitated from the surface of the glass plate to the backside of the glass plate and from the backside of the glass plate to the surface of the glass plate.

Thus, the obtained crystallized glass article is approximately 16 mm thick and an animal pattern with a different color background, in this case, a white crane flying in the gray sky, is observed after the surface is polished. The pattern is approximately 3 mm deep. Comparing to the conventional crystallized glass article with patterns, the crystallized glass article having the outline of a flying white crane is more three-dimensional. Moreover, the X-ray test result shows that in the crystallized glass article, the portion formed by the small glass masses contains diopside (CaO.MgO.2SiO$_2$) crystals and the portion formed by the glass plate contains precipitated β-wollastonite (β-CaO.SiO$_2$) type crystals.

Comparative Example

First, 65.1 wt. % of SiO$_2$, 6.6 wt. % of Al$_2$O$_3$, 12.0% of CaO, 3.3 wt. % of Na$_2$O, 2.3 wt. % of K$_2$O, 4.1 wt. % of BaO, and 6.6 wt. % of ZnO of glass raw material are mixed and melted at 1500° C. for 16 hours. Then, the molten glass is water quenched, dried, and classified to obtain small glass masses with particle size in a range of 1-3 mm. The small glass masses are crystalline glass which after heat treatment can be a white crystallized glass containing precipitated β-wollastonite (β-CaO.SiO$_2$) type crystals and having a coefficient of thermal expansion of 65×10$^{-7}$/° C. between 30 and 380° C.

Next, 51.0 wt. % of SiO$_2$, 19.0 wt. % of Al$_2$O$_3$, 4.7 wt. % of MgO, 4.1 wt. % of ZnO, 2.2 wt. % of TiO$_2$, 1.5 wt. % of ZrO$_2$, 6.0 wt. % of B$_2$O$_3$, 8.5 wt. % of Na$_2$O, 2.8 wt. % of K$_2$O, and 0.2 wt. % of CaO of glass raw material are mixed and melted at 1500° C. for 16 hours. Then, the molten glass is made into a plate by roll-out method, obtaining a glass plate with a thickness of 5 mm. The glass plate is crystalline glass which after heat treatment can be a white crystallized glass containing precipitated forsterite (2MgO.SiO$_2$) type crystals and having a coefficient of thermal expansion of 67×10$^{-7}$/C between 30 and 380° C. The glass plate is cut along an S curve by using a water knife, resulting in two glass plates.

Subsequently, the prepared small glass masses are accumulated in a fireproof mold coated with a mold release agent; the thickness of the accumulated small glass masses is approximately 12 mm. After leveling the accumulated small glass masses, the two prepared glass plates are placed on and fully cover the surface of the small glass masses with the cut faces tightly bonded to form the S letter curve. At 1100° C. for 2 hours with a heating rate of 120° C./hr, the small glass masses are softened and fusion-bonded while precipitating crystals therein to form a second crystallized glass layer, and on the second crystallized glass layer, a first crystallized layer is formed from crystals precipitated by the two glass plates while being softened and fusion-bonded, whereby a crystallized glass article is formed by integrating the second crystallized glass layer and the first crystallized glass layer.

Thus, a crystallized glass article with a thickness of approximately 16 mm is obtained but a natural-marble-like pattern illustrating a white S curve like the one obtained by the invention in aforementioned examples is not observed after the surface is polished. Moreover, the depth of the S curve pattern of the conventional crystallized glass article is unlike that of the invention. The X-ray test result shows that the second crystallized glass layer contains precipitated β-wollastonite (β-CaO.SiO$_2$) type crystals and the first crystallized glass layer contains precipitated forsterite (2MgO.SiO$_2$) type crystals.

Furthermore, polishing the backside would obtain a conventional crystallized glass particle with white natural-marble-like patterns, in which the natural-marble-like patterns shown thereon vary with the presence and directions of β-wollastonite (β-CaO.SiO$_2$) crystals or diopside (CaO.MgO.2SiO$_2$) crystals that are confined to the shape of the small glass masses. Therefore, patterns formed by this method are restricted by the shape and size of small glass masses and cannot be enlarged.

What is claimed is:

1. A crystallized glass article having patterns, comprising:
(A) a first crystallized glass layer, which is formed by at least one first crystalline glass plate,
wherein the first crystalline glass plate is of a crystalline glass material having a characteristic of precipitating crystals from the surface of the crystalline glass material to the interior thereof when being heated at a temperature higher than the softening point, marble-like patterns and a specific pattern different from the marble-like patterns observed on the crystallized glass article are formed by heating the first crystalline glass plate at a temperature higher than the softening point to precipitate crystals therein, and the specific pattern varies with the shape and/or the combination of the at least one first crystalline glass plate,
wherein the first crystallized glass layer is formed of a crystallized glass containing precipitated β-wollastonite (β-CaO.SiO$_2$) type crystals or diopside (CaO.MgO.2SiO$_2$) type crystals; and
(B) a second crystallized glass layer stacked on or below the first crystallized layer, the second crystallized glass layer being formed by softening and/or fusion bonding a plurality of small crystalline glass masses and/or at least one second crystalline glass plate through a heat treatment to precipitate crystals therein.

2. The crystallized glass article having patterns of claim 1, wherein the marble-like patterns vary with the shape and/or the combination of the at least one first crystalline glass plate.

3. The crystallized glass article having patterns of claim 1 or 2, wherein the second crystallized glass layer is formed of crystallized glasses containing precipitated β-wollastonite (β-CaO.SiO$_2$) type crystals or diopside (CaO.MgO.2SiO$_2$) type crystals.

4. The crystallized glass article having patterns of claim 1 or 2, wherein the difference in the coefficients of thermal expansion between any two of the small crystalline glass masses, the first crystalline glass plate, and the second crystalline glass plate is between 0 and 10×10$^{-7}$/° C.

* * * * *